Dec. 8, 1942.  F. W. TAYLOR  2,304,667
ELECTRICAL CONDENSER
Filed April 26, 1940
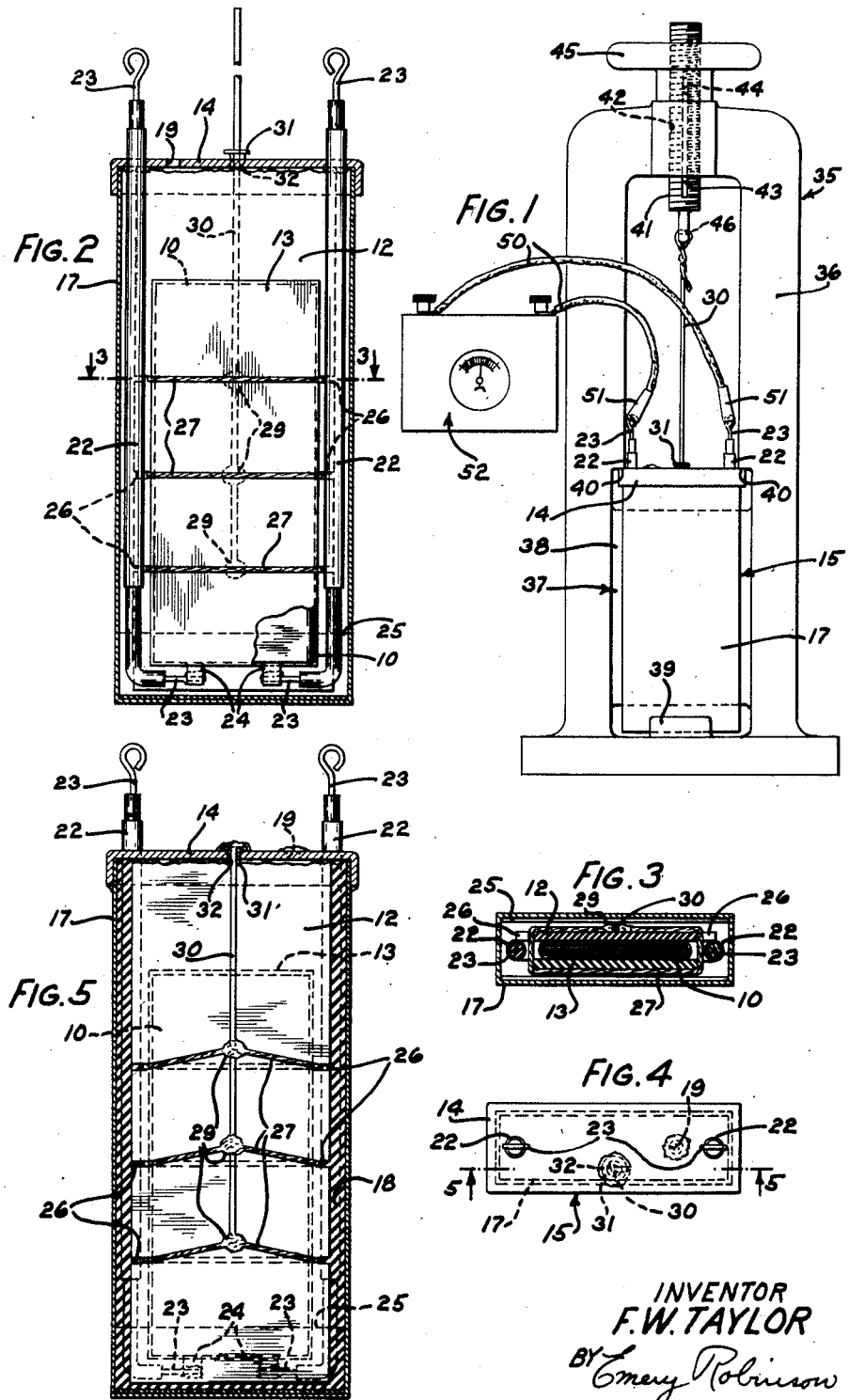
INVENTOR
F. W. TAYLOR
BY Emery Robinson
ATTORNEY Patented Dec. 8, 1942

2,304,667

UNITED STATES PATENT OFFICE 2,304,667

ELECTRICAL CONDENSER

Frank W. Taylor, Chicago, Ill., assignor to Western Electric Company, Incorporated, New York, N. Y., a corporation of New York Application April 26, 1940, Serial No. 331,749

8 Claims. (Cl. 175—41)

This invention relates to electrical condensers and particularly to condensers capable of being adjusted to fixed capacity limits and a method of producing and simultaneously adjusting and testing such condensers during manufacture.

In the manufacture of electrical condensers, particularly of the fixed capacity type, which include alternate layers of appropriate conducting and dielectric elements, which are potted in a usual manner, the potting including an impregnating and sealing step, it has been found that the impregnating operation influences, to a variable extent, the original capacity of the condensers, due to normal variations in the materials combined together during the impregnating operation or from other causes. Invariably this results in increasing the resultant capacity of the condenser to a varying extent so that it has heretofore been difficult or impracticable to produce fixed condensers of a predetermined desired capacity within extremely close limits after impregnation.

Objects of this invention are to provide, in a condenser of the above type, simple capacity control means whereby the condenser is capable of being adjusted after impregnation within close capacity limits and an economical method of simultaneously adjusting the capacitance of and testing such condensers during manufacture.

In producing electrical condensers in accordance with one embodiment of this invention, as practiced in connection with the manufacture of condensers of the type hereinbefore described, a condenser is produced having an original or initial capacity which after impregnation and sealing is lower than the ultimate desired capacity, the condenser then being positioned between two clamping plates, one of which is fixed to the inside of a condenser container cover and is formed along opposite longitudinal edges at a plurality of locations with aligned notches. The plates and condenser are held in assembled relation by wrapping therearound and tying under moderate tension a plurality of transverse wire straps which are lodged in the plate notches. Fixed to and interconnecting each of the wire straps along the longitudinal center line of the plates is a draw wire having its free end extending through an aperture in the cover and projecting therefrom a suitable distance. Thereafter, in a usual manner, terminals on the condenser are soldered to inner ends of external terminals extending through the cover, the cover soldered to the container, the assembly tested for leaks and then successively vacuum dried and impregnated. The assembly is then allowed to cool to a predetermined temperature slightly above the range at which the fluid impregnating compound changes to a solid state. While maintained at such temperature the condenser assembly is placed in a holding and adjusting device and then connected to an electrical testing set and the capacity is adjusted by slowly drawing the projecting draw wire outwardly by means, to which the wire is gripped, employing a micrometer screw. Since the tensioned draw wire is connected to the transverse wire straps greater tension is put thereon and a compressing action is thereby applied to the condenser through the clamping plates and an increase in the capacity of the condenser results therefrom in a manner well known in the art. When the desired capacity is reached, as indicated by the testing set, the tensioned control wire is soldered at the cover aperture to maintain the capacity fixed. Thereafter if the condenser is found satisfactory in other respects, the excess length of draw wire is clipped off close to its point of soldering.

Other objects and advantages of this invention will more fully appear from the following description taken in connection with the accompanying drawing, in which Fig. 1 is a view in front elevation of an assembled condenser embodying the capacity control feature of the invention, shown mounted in a holding and adjusting jig and the condenser connected to an electrical test set, the jig and test set being illustrated diagrammatically;

Fig. 2 is an enlarged vertical sectional view of the condenser assembly shown in Fig. 1 before drawing outwardly the control wire to adjust the capacity of the condenser;

Fig. 3 is a plan sectional view of the condenser assembly taken on the line 3—3 of Fig. 2;

Fig. 4 is a plan view of the condenser assembly after the capacity of the condenser has been adjusted, the condenser assembly being rotated 180° from the position shown in Figs. 1 and 2, and Fig. 5 is a vertical sectional view taken on the line 5—5 of Fig. 4.

The improved method of producing and adjusting the capacity of electrical condensers, the fixed capacity of which, when completed, will be within a permissible variation from a predetermined capacity, has been disclosed in connection with the manufacture of wound type condensers comprising alternate strips of conducting and dielectric materials, such as tinfoil and paper, the condenser being wound in a usual manner.

Referring to the drawing, particularly to Figs. 2 and 3, the numeral 10 indicates a condenser unit of the type hereinbefore referred to, produced with a capacity which, for example, may be 15% lower, after impregnation than the ultimate desired fixed capacity and outside the permissible variation thereof. In practicing the method the condenser unit is positioned between two clamping plates 12 and 13, having a suitable thickness to resist buckling during the operation of capacity adjustment and preferably of metal, for example, brass to resist oxidation. The plate 12 at the time of assembling it with the condenser unit 10 and the plate 13 has its upper end edge fixed, for example, by soldering to the inside surface of a cup-shaped cover 14. In some cases the clamping plates 12 and 13 may be made of phenol fibre with one plate abutting the inner surface of the cover 14. The cover 14 in a completed condenser assembly, indicated at 15 (Fig. 1), is soldered around its lower edge to a container or can 17 in which the condenser is finally sealed by means of a suitable impregnating compound, for example, mineral wax, indicated at 18 in Fig. 5, and entered into the can while in a heated fluid state through an aperture 19 in the cover, the aperture being closed by filling it with solder (Figs. 4 and 5). Soldered to the cover 14 at opposite ends thereof are two hollow terminal supports 22 through which extend insulated terminal wires 23 which are soldered at their lower ends to terminals 24 of the condenser unit 10 (Figs. 2 and 3). The plate 12 is of such length that it extends from its point of attachment to the cover 14 to a suitable distance above the upper surface of a U-shaped insulator 25 resting at the bottom of the can 17 and in width it extends between the longitudinal central lines of the terminal supports 22, with which it abuts. The plate 13 is substantially the width and height of the condenser unit 10 and its longitudinal edges are slightly spaced from the terminal supports 22.

Formed in each longitudinal edge of the plate 12 are a plurality of equally spaced aligned notches 26 (Fig. 5) which are cut back from the edges of the plate to substantially the opposite longitudinal edges of the plate 13. The plates 12 and 13 are clamped upon opposite sides of the condenser unit 10 by means of stranded wire straps 27 which are wrapped around the plates, lodged in the notches 26 of the plate 12 and suitably tied or connected with an equal moderate tension at points intermediate the longitudinal edges of the plates. With the use of stranded wire the straps 27 draw more easily through the notches 26 and they have less tendency to break or pull unevenly on the assembly. Interconnecting each of the straps 27 and soldered thereto, as indicated at 29, at their tied points is a control or draw wire 30 which extends longitudinally of the assembled plates 12 and 13 and condenser unit 10, the free end of the wire being threaded through an eyelet 31 loosely fitted in an aperture 32 in the upper wall of the cover 14. It is necessary that the draw wire 30 should have a tensile strength sufficient to resist breaking during the capacity adjustment. The eyelet 31 provides a long and smooth guide for the draw wire 30, thus preventing the sharp edges of the metal surrounding the aperture 32 from scraping the wire which would be the case if an eyelet was not used. The wire 30 (Figs. 1 and 2) projects from the eyelet 31 and cover 14 for some distance and its length is not disturbed until the condenser capacity has been adjusted, in a manner to be presently described, and after it has been found satisfactory in other respects.

The cover 14 carrying the clamped condenser unit 10 is now fitted over the open end of the can 17 and is soldered around its lower edge to the can, as previously described. Thereafter, in a manner well known in the art of producing condensers, the condenser assembly 15 is tested for leaks, the apertures 19 and 32 and opening in the eyelet 31 first being temporarily sealed. Thereafter, the apertures 19 and 32 and eyelet 31 are unsealed and the condenser assembly 15 is placed in an upright position in a heated vacuum drying and impregnating tank (not shown) where, in a well known manner, the condenser assembly is first vacuum dried and then the impregnating and sealing compound 18 is admitted to the tank while the drying temperature is maintained. The condenser assembly 15 becomes immersed in the compound, which flows through the aperture 19 in the cover 14 and completely fills all voids in the cam 17. The condenser assembly 15 is then allowed to cool to a predetermined temperature slightly above the range at which the fluid mineral wax compound 18 changes to a solid state.

While maintained at substantially this last mentioned temperature, the condenser assembly 15, referring particularly to Fig. 1, is placed in a holding and adjusting device 35. The device 35, in the embodiment illustrated, comprises a frame 36 provided at its lower portion with a nesting recess or pocket 37 for receiving the condenser assembly, the assembly being loosely held vertically in the pocket by spaced wall portions 38 and 39 on the frame.

Opposite vertical walls of the nesting pocket 37 at its upper end are formed with stop surfaces 40 against which the upper surface of the condenser assembly cover 14 is drawn during the capacity adjustment. In its upper portion, the frame 36 is equipped with a micrometer screw 41, which is longitudinally movable in an aperture 42 in the frame and is restrained from rotary movement by means of a key 43 fixed to the frame and projecting into a keyway 44 formed in the screw 41. The screw 41 is coaxially aligned with the eyelet 31 and aperture 32 through which the draw wire 30 extends. Threaded onto the upper end of the screw 41 is a hand wheel 45 which bears against the upper surface of the frame. The lower end of the screw 41 is reduced in diameter and is provided with an aperture 46, through which is threaded the free end of the draw wire 30, the wire end being wrapped around the wire to prevent it from being drawn through the aperture during the operation of adjusting the capacity of the condenser unit 10. The particular type of holding and adjusting device is not material to the invention and may evidently be of any appropriate and well known form and arrangement.

Thereafter the condenser assembly terminals 23 are connected by means of leads 50, equipped with test clips 51, to a capacity testing set 52 which is shown diagrammatically and the testing current switched on. The testing set 52 is not disclosed or described in detail since such instruments are familiar and well known. It might comprise a source of alternating current feeding a four armed bridge of which two standard coils and a standard condenser would be three arms and the condenser to be tested would be the fourth, while a voltmeter or ammeter of appropriate design and sensitivity would be in the bridge circuit.

As described hereinbefore, the condenser unit 10 is produced with an initial capacity which after impregnation may be as much as 15% lower than the ultimate desired capacity and that this variation in the capacity of the condenser unit 10 from the initial capacity thereof is such that it is within allowable limits which can be adjusted by compressing the condenser unit through the action of drawing the plates 12 and 13 closer together. Thus, the testing set 52 will indicate that the capacity of the condenser unit 10 is still slightly lower than the ultimate desired capacity, but no doubt a variation from the initial capacity of the condenser unit will be indicated. The condenser capacity is now adjusted by slowly rotating the hand wheel 45 of the device 35 in such a direction that the micrometer screw 41 will be slowly raised and therewith the draw wire 30. The condenser assembly 15 to which the wire 30 is attached will move upwardly until it engages the stop surfaces 40 on the frame 36.

In the continued rotation of the hand wheel 45 the draw wire 30 is tensioned and drawn outwardly through the eyelet 31 in the aperture 32 of the can cover 14. Since the tensioned draw wire 30 is connected at its inner end to each of the transverse stranded wire straps 27 they are each drawn through their respective notches 26 and with greater tension around the clamping plates 12 and 13 with the result that the plates are drawn closer together, thus affecting a compressing action on the condenser unit 10 positioned therebetween and an increase in its capacity. The hand wheel 45 is slowly rotated to draw the wire 30 outwardly until the testing device indicates that the capacity has been increased to a predetermined value which is calculated to give the final desired fixed value at room temperature. With the draw wire 30 held thus under tension the wire is soldered to the eyelet 31 to maintain the adjusted capacity and the eyelet is solder sealed in the aperture 32. Upon the condenser assembly 15 cooling to approximately room temperature, the filling aperture 19 is solder sealed. In most cases the capacity as thus obtained will be found satisfactory and fixed, but if not, it may again be adjusted by unsealing the draw wire 30 from the eyelet 31 and unsealing the filling aperture 19. The condenser assembly 15 is then reheated to a predetermined temperature slightly above the range at which the impregnating compound changes to a solid state. Thereafter, the condenser unit 10 may be readjusted and the assembly resealed in the manner described hereinbefore. In case the capacity value slightly exceeds the specified limits the hand wheel 45 is rotated in a direction opposite to the direction used in increasing the capacity, thus releasing the compression action of the plates 12 and 13 upon the condenser unit 10 and decreasing the capacity thereof to the desired value.

Upon the condenser being found satisfactory in other respects the excess length of the draw wire 30 is clipped off close to its point of soldering.

Although a specific form of the invention has been illustrated and described, it will be understood that it is not limited to the details shown or the exact steps described or any particular order thereof, but is capable of modification and variation within the spirit of the invention and within the spirit of the appended claims.

What is claimed is:

1. The method of producing a condenser of fixed capacity within predetermined desired limits comprising producing a condenser unit including alternate layers of conducting and dielectric elements, the initial capacity of which after impregnation will be lower than the ultimate desired capacity, assembling said unit in a container with means controllable by a pulling action thereon along one side of and longitudinally of said elements from outside said container for varying the capacity of the unit after impregnation, impregnating the unit in a fluid compound, permitting the compound to almost harden, and actuating said capacity control means before the compound changes to a solid state to adjust and fix the capacity of the unit at the desired value.

2. The method of producing a condenser of fixed capacity within predetermined desired limits comprising producing a condenser unit including alternate layers of conducting and dielectric elements, the initial capacity of which after impregnation will be lower than the ultimate desired capacity, assembling said unit in a container with means carried thereby for adjusting the capacity thereof including a member operable by a pulling action thereon along one side of and longitudinally of said elements from outside said container effective to vary the action of said means and thereby the capacity of the unit after impregnation, impregnating the unit in a fluid compound, permitting the compound to almost harden, and actuating said capacity adjusting means before the compound changes to a solid state to adjust and fix the capacity of the unit at the desired value.

3. The method of producing a condenser of fixed capacity within predetermined desired limits comprising producing a condenser unit including alternate layers of conducting and dielectric elements, the initial capacity of which after impregnation will be lower than the ultimate desired capacity, assembling said unit in a container with means controllable by a pulling action thereon along one side of and longitudinally of said elements from outside said container for varying the capacity of the unit after impregnation, impregnating the unit in a fluid compound, permitting the compound to almost harden, and before the compound changes to a solid state connecting the unit to a capacity testing set and while testing said unit actuating said capacity control means to adjust and fix the capacity of the unit at the desired value.

4. A condenser comprising a container, a condenser unit including alternate layers of conducting and dielectric elements positioned therein, means associated with opposite sides of said unit for exerting pressure thereon, means operatively connected to said pressure means including a single draw member extending longitudinally of said elements controllable from without said container for varying the pressure thereof upon said unit and thereby the capacity thereof, and impregnating compound surrounding said condenser assembly and filling the space within the container.

5. A fixed capacity condenser comprising a condenser unit including alternate layers of conducting and dielectric elements, a container therefor, pressure applying means at opposite sides of said unit, means operatively associated with said pressure applying means including a single draw member extending longitudinally of said elements operative from without said container for actuating said pressure means to vary its action on the unit and thereby the capacity thereof, and impregnating compound surrounding said condenser assembly and filling the space within the container.

6. A fixed capacity condenser comprising a condenser unit including alternate layers of conducting and dielectric elements, a container therefor, clamp members at opposite sides of said unit, means for strapping said members and unit together, a draw member connected to said strapping and extending from and fixed under tension to said container, said assembly and container being arranged and cooperating together to prevent movement therebetween when said draw member is tensioned to increase the capacity of the unit, and impregnating compound surrounding said assembly and filling the space within the container.

7. A fixed capacity condenser comprising a condenser unit including alternate layers of conducting and dielectric elements, a container therefor, pressure applying plates at opposite sides of said unit, one of said plates being attached to said container, a plurality of straps encircling said unit and plates under an initial moderate tension, an element connected to said straps and operative from without said container for increasing the tension thereon and the compressing action of said plates on the unit and thereby the capacity thereof, means for securing said element to said container to maintain the increased tension on said straps, and impregnating compound surrounding said condenser assembly and filling the space within the container.

8. A fixed capacity condenser comprising a condenser unit including alternate layers of conducting and dielectric elements, a container therefor, a cover sealed to said container, pressure applying plates at opposite sides of said unit, one of said plates being secured at one end to said cover, said latter plate having a plurality of aligned notches in opposite longitudinal edges, a plurality of straps lodged in said notches encircling said unit and plates under an initial moderate tension, a draw member connected at its inner end to said straps and projecting at its outer end through an aperture in said cover for increasing the tension on said straps and the compressing action of said plates on the unit and thereby the capacity thereof, said draw member being fixed to said cover to maintain the increased tension on said straps, and impregnating compound surrounding said condenser assembly and filling the space within the container.

FRANK W. TAYLOR.